(12) United States Patent
Yen

(10) Patent No.: US 6,975,161 B2
(45) Date of Patent: Dec. 13, 2005

(54) CHARGE PUMP AND VOLTAGE DOUBLER USING THE SAME

(75) Inventor: Chin-Hsien Yen, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 7 days.

(21) Appl. No.: 10/671,273

(22) Filed: Sep. 24, 2003

(65) Prior Publication Data

US 2004/0104761 A1    Jun. 3, 2004

(30) Foreign Application Priority Data

Dec. 3, 2002    (TW) .............................. 91135002 A

(51) Int. Cl.[7] .............................. G05F 3/16; H02M 3/18
(52) U.S. Cl. ........................................ 327/536; 363/60
(58) Field of Search ..................... 363/59, 60; 327/536

(56) References Cited

U.S. PATENT DOCUMENTS 5,436,587 A * 7/1995 Cernea ........................ 327/536
6,373,327 B1 * 4/2002 Nakamura .................... 327/536

* cited by examiner

Primary Examiner—Timothy P. Callahan
Assistant Examiner—Terry L. Englund
(74) Attorney, Agent, or Firm—J.C. Patents

(57) ABSTRACT

A charge pump and a voltage doubler are provided. The charge pump minimizes the difference in voltage between the terminals of a MOS transistor by serially connecting PMOS and NMOS transistors inside the charge pump circuit. The charge pump is able to provide a higher voltage while avoiding a large voltage difference at the gate-source, gate-base and gate-drain interfaces.

7 Claims, 4 Drawing Sheets

CHARGE PUMP AND VOLTAGE DOUBLER USING THE SAME

CROSS-REFERENCE TO RELATED APPLICATION

This application claims the priority benefit of Taiwan application serial no. 91135002, filed Dec. 3, 2002.

BACKGROUND OF THE INVENTION

1. Field of Invention

The present invention relates to a charge pump and a voltage doubler using the same. More particularly, the present invention relates to a charge pump comprising low-pressure fabricated metal-oxide-semiconductor (MOS) devices and a voltage doubler using the same.

2. Description of Related Art

FIG. 1A is a circuit diagram of a conventional charge pump. As shown in FIG. 1A, the charge pump 10 comprises two N-type metal oxide semiconductor (NMOS) transistors 102 and 104 and two capacitors 112 and 114. One source/drain terminal of the NMOS transistor 102 is electrically coupled to an input voltage $V_{IN}$ terminal while the other source/drain terminal of the NMOS transistor 102 is electrically coupled to one terminal 112a of the capacitor 112. The substrate terminal of the NMOS transistor 102 is connected to ground and the gate terminal of the NMOS transistor 102 is connected to one terminal 114a of the capacitor 114. Voltage at the capacitor terminal 114a serves as an output voltage $V_{O1}$ of the charge pump 10. Similarly, one source/drain terminal of the NMOS transistor 104 is electrically coupled to the input voltage $V_{IN}$ terminal while the other source/drain terminal of the NMOS transistor 104 is electrically coupled to the capacitor terminal 114a. The substrate terminal of the NMOS transistor 104 is connected to ground and the gate terminal of the NMOS transistor 104 is electrically connected to the capacitor terminal 112a. Voltage at the capacitor terminal 112a serves as another output voltage $V_{O2}$ of the charge pump 10. In addition, the other terminal 112b of the capacitor 112 receives a clocking signal CK and the other terminal 114b of the capacitor 114 receives an inverse clocking signal CK' during operation.

Initially, voltage difference at the two terminals of both capacitors 112 and 114 is at 0V. Assume that the clocking signal CK is a signal having a voltage between 0 to $V_1$ during operation, the voltage $V_1$ is identical or greater than $V_{IN}$ and the clocking signal CK is at a high potential level initially. At the beginning of operation, voltage difference between the ends of the capacitor 112 is maintained at 0V due to the capacitor property. Hence, voltage at the capacitor terminal 112a is raised to $V_1$. Under this condition, because the inverted clocking signal CK' is at 0V, the charge pump 10 outputs a voltage $V_{O1}$ of 0V and a voltage $V_{O2}$ of $V_1$. Thereafter, since $V_1 \geq V_{IN}$, the NMOS transistor 104 conducts and hence $V_{IN}$ gradually charges up the capacitor 114. Consequently, after the passage of some time, voltage at the capacitor terminal 114a is raised to a level almost identical to $V_{IN}$.

When phase of the clocking signal CK reverses back to 0V (that is, phase of the inverted clocking signal CK' reverses back to $V_1$), voltage difference between the terminals 112a and 112b of the capacitor 112 is maintained during a transient period. Consequently, the capacitor terminal 112a returns to 0V. Similarly, because the voltage difference between the terminals 114a and 114b of the capacitor 114 is maintained during a transient period when phase of the inverted clocking signal CK' reverses, voltage at the capacitor terminal 114a is pushed up to $V_{IN}+V_1$. In other words, during the transient phase inversion of the clocking signal CK, the output voltage $V_{O1}$ is $V_{IN}+V_1$ and the output voltage $V_{O2}$ is at 0V. Under this condition, the NMOS 104 is cut off and the NMOS transistor 102 conducts because the gate voltage (equivalent to the output voltage $V_{O1}$) is greater than the input voltage $V_{IN}$. Thus, voltage at the capacitor terminal 112a gradually rises from 0V towards $V_{IN}$.

For the same reason, during the transient period when the phase of the clocking signal CK reverses, the output voltage $V_{O1}$ drops back to $V_{IN}$ while the output voltage $V_{O2}$ rises up towards $V_{IN}+V_1$. In subsequent operations, the output voltages $V_{O1}$ and $V_{O2}$ will fluctuate in cycles between $V_{IN}$ and $V_{IN}+V_1$.

However, for this type of circuit, the biggest voltage difference sustainable by the gate-substrate of the NMOS transistors 102 and 104 is $V_{IN}+V_1$. Therefore, the NMOS transistors 102 and 104 must be able to withstand a voltage greater than $V_{IN}+V_1$. In other words, the gate-substrate interface of the NMOS transistors 102 and 104 must be able to withstand a voltage difference equivalent to the output voltage value.

A voltage doubler that uses this type of charge pump was first disclosed in the article 'A High-Efficiency CMOS Voltage Doubler' of the IEEE Journal of Solid State Circuits, Vol. 33, No. 3, March 1998 by Philippe Deval and Mechel J. Declercq. FIG. 1B is a circuit diagram of the voltage doubler that uses the conventional charge pump design shown in FIG. 1A. The clocking signal CK varies cyclically between $V_{IN}$ and 0V during operation. Hence, the output voltage $V_{OUT}$ approaches $2*V_{IN}$. Similarly, the gate-substrate interface of the NMOS transistor 122 and 124 must be able to sustain a voltage difference of at least $2*V_{IN}$. In FIG. 1B, a clock signal CK is connected to a terminal 132b of the capacitor 132. The another terminal 132a of the capacitor 132 is connected to the NMOS transistor 122. Similarly, an inverted clock signal CK' is connected to a terminal 134b of the capacitor 134. The another terminal 134a of the capacitor 134 is connected to the NMOS transistor 124. In addition, the PMOS transistors 140, 142, 144, and 146 form a circuit, as shown in FIG. 1B, which has two terminals coupled to the terminals 132a and 134a and a voltage output terminal $V_{OUT}$. The voltage output terminal is also coupled to a ground via a capacitor 152. In addition all the substrates of the PMOS transistors 140, 142, 144, and 146 are coupled to the around via a capacitor 150.

SUMMARY OF THE INVENTION

Accordingly, one object of the present invention is to provide a charge pump and a voltage doubler using the same. Through the serial connection of a P-type metal oxide semiconductor (PMOS) transistor with an N-type metal oxide semiconductor (NMOS) transistor, metal oxide semiconductor (MOS) devices within the charge pump are subjected to a lower voltage differential at the gate-source, gate-substrate and gate-drain interface. Nevertheless, the same degree of voltage push-up as in the conventional technique is provided.

To achieve these and other advantages and in accordance with the purpose of the invention, as embodied and broadly described herein, the invention provides a charge pump. The charge pump has a voltage source, a signal source, a first and a second control signal generation unit, a first and a second output voltage generation unit and a first and a second capacitor. The voltage source provides an input voltage and the signal source provides a clocking signal and an inverted clocking signal for operation.

The first control signal generation unit receives an input voltage, the inverted clocking signal and a ground voltage and outputs a set of first control signals whose voltage levels are determined by the inverted clocking signal. The second control signal generation unit receives an input voltage, the clocking signal and a ground voltage and outputs a set of second control signals whose voltage levels are determined by the clocking signal.

The first output voltage generation unit has a first output terminal. The first output voltage generation unit receives the input voltage and the first control signal and determines if the circuit between the input voltage and the first output terminal becomes electrically conductive according to the first control signal. Similarly, the second output voltage generation unit has a second output terminal. The second output voltage generation unit receives the input voltage and the second control signal and determines if the circuit between the input voltage and the second output terminal becomes electrically conductive according to the second control signal.

A first capacitor terminal of the first capacitor receives the clocking signal. The other capacitor terminal of the first capacitor outputs the first output voltage and the capacitor terminal couples electrically with the first output terminal. A first capacitor terminal of the second capacitor receives the inverted clocking signal. The other capacitor terminal of the second capacitor outputs the second output voltage and the capacitor terminal couples electrically with the second output terminal.

In brief, voltage differential at the gate-substrate, gate-drain and gate source interface of various MOS devices inside the charge pump of this invention is smaller than the voltage differential at the same interfaces inside the MOS devices of a conventional charge pump. Hence, a low pressure CMOS fabrication process can be used to fabricate MOS devices having a voltage push-up capacity identical to the conventional technique but with a longer working life.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
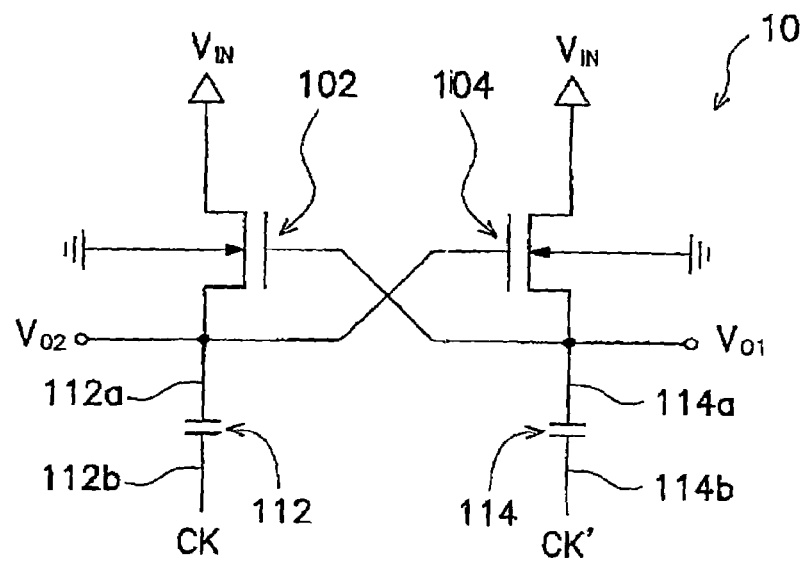
FIG. 1A is a circuit diagram of a conventional charge pump.
Figure 1B:
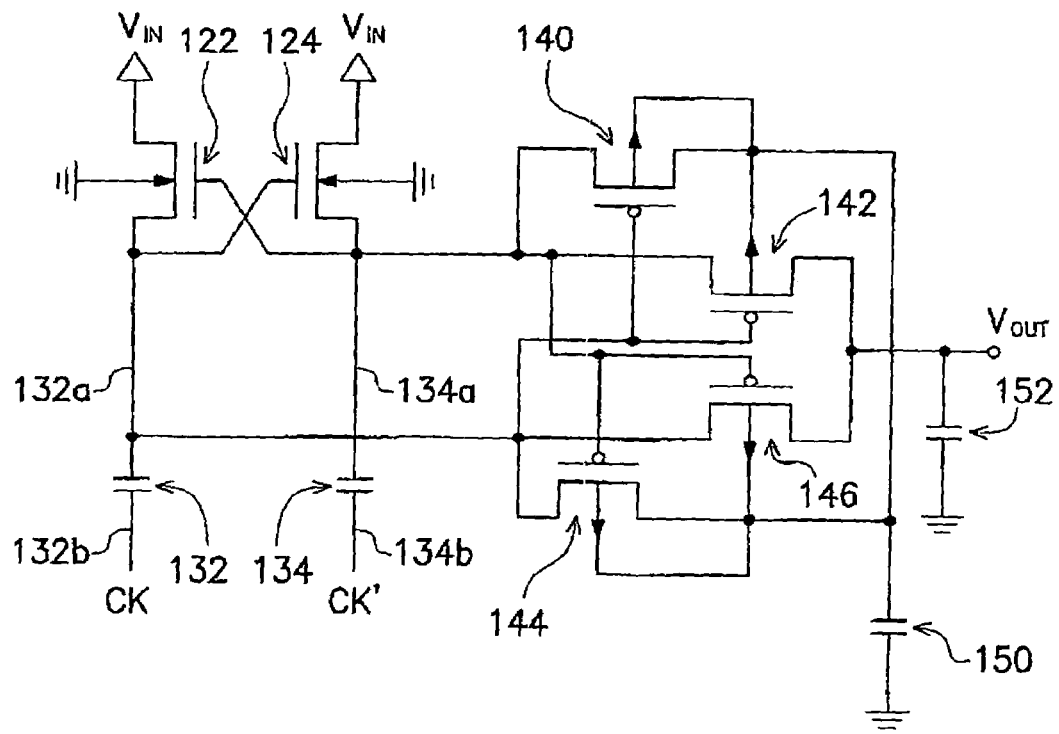
FIG. 1B is a circuit diagram of the voltage doubler that uses the conventional charge pump design shown in FIG. 1A.

Reference will now be made in detail to the present preferred embodiments of the invention, examples of which are illustrated in the accompanying drawings. Wherever possible, the same reference numbers are used in the drawings and the description to refer to the same or like parts.

Figure 2:
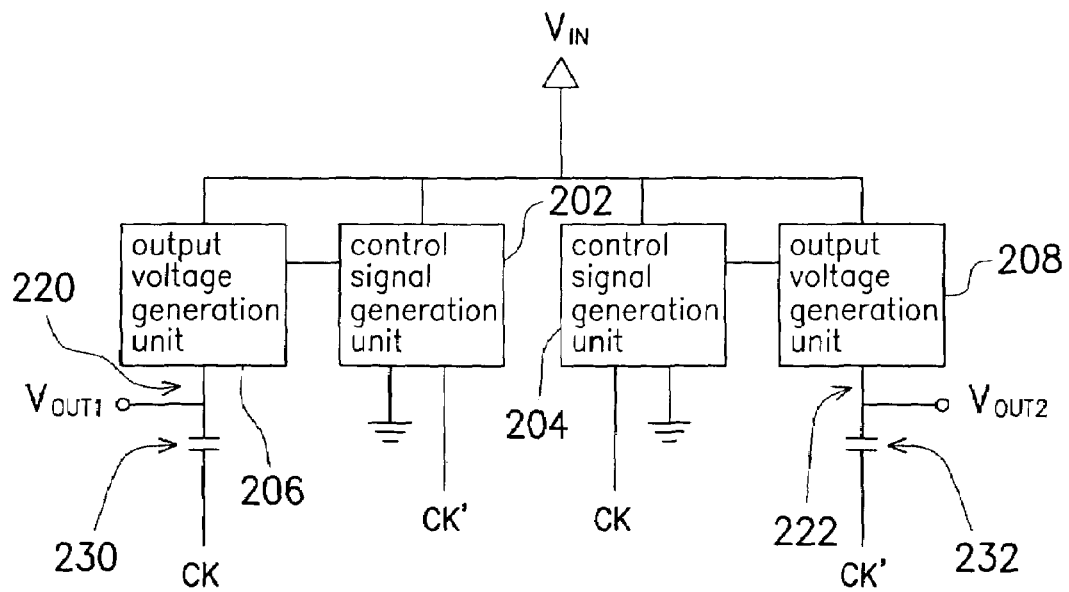
FIG. 2 is a block diagram showing the circuit of a charge pump according to one preferred embodiment of this invention.

FIG. 2 is a block diagram showing the circuit of a charge pump according to one preferred embodiment of this invention. As shown in FIG. 2, the charge pump includes two control signal generation units 202 and 204, two output voltage generation units 206 and 208 and two capacitors 230 and 232. The control signal generation unit 202 receives an input voltage $V_{IN}$ from a voltage source (not shown), a ground voltage and an inverted clocking signal CK' from a signal source (not shown), and generates a first control signal. The control signal generation unit 204 receives the input voltage $V_{IN}$, a ground voltage and a clocking signal CK from a signal source (not shown), and generates a second control signal. The clocking signal CK and the inverted clocking signal CK' have a phase inversion relationship.

In this embodiment, voltage level of the first control signal from the control signal generation unit 202 is determined by the inverted clocking signal CK'. In other words, the inverted clocking signal CK' at a low potential may prompt the control signal generation unit 202 to produce a high or a low first control signal according to the circuit design. Conversely, the inverted clocking signal CK' at a high potential may also prompt the control signal generation unit 202 to produce a high or a low first control signal. In a similar way, the relationship between the control signal generation unit 204 and the second control signal closely matches the relationship between the control signal generation unit 202 and the first control signal.

The output voltage generation unit 206 receives the voltage $V_{IN}$ and the first control signal and outputs via an output terminal 220. The output voltage generation unit 208 receives the voltage $V_{IN}$ and the second control signal and outputs via an output terminal 222. For the output voltage generation unit 206, whether the input voltage $V_{IN}$ is connected to the first output terminal 220 by an internal circuit depends on the voltage level of the first control signal. For example, if the first control signal is at a high potential, the circuit between the input voltage $V_{IN}$ and the first output terminal 220 is connected. On the other hand, if the first control signal is at a low potential, circuit connection between the input voltage $V_{IN}$ and the first output terminal 220 is cut. Similarly, for the output voltage generation unit 208, if the second control signal is at a high potential, the circuit between the input voltage $V_{IN}$ and the second output terminal 222 is connected. On the contrary, if the second control signal is at a low potential, circuit connection between the input voltage $V_{IN}$ and the second output terminal 222 is cut. Obviously, contrary or different response to the control signal for the output voltage generation units 206 and 208 is also possible.

The charge pump circuit in FIG. 2 further includes two capacitors 230 and 232. One end of the capacitor 230 receives the clocking signal CK while the other end of the capacitor 230 couples electrically to the first output terminal 220. Meanwhile, the first output voltage is output from the output terminal $V_{OUT1}$. Similarly, one end of the capacitor 232 receives the inverted clocking signal CK' while the other end of the capacitor 232 couples electrically with the second output terminal 222. The second output voltage is output from the output terminal $V_{OUT2}$.

Figure 3:
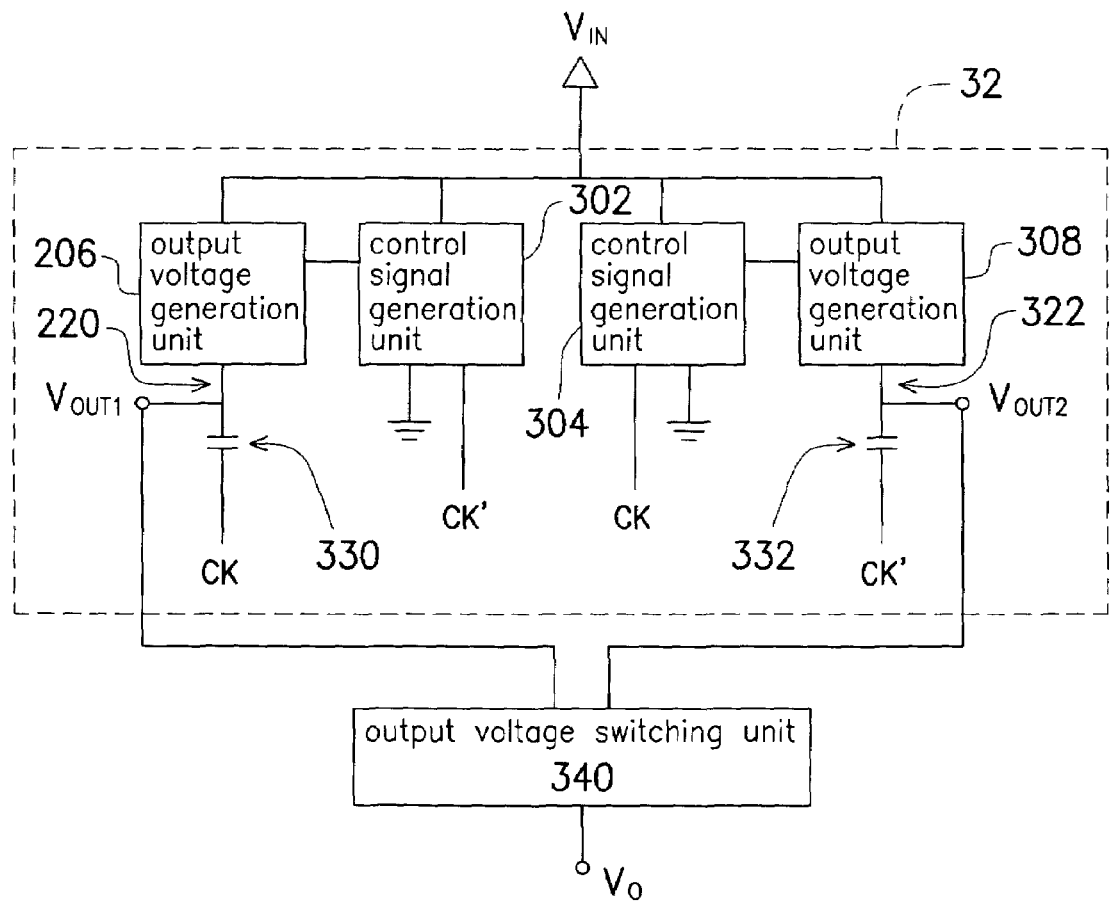
FIG. 3 is a block diagram showing the circuit of a voltage doubler according to one preferred embodiment of this invention.

FIG. 3 is a block diagram showing the circuit of a voltage doubler according to one preferred embodiment of this invention. In FIG. 3, the charge pump structure and operating method is similar the one shown in FIG. 2 and hence detailed description is omitted. In general, the largest voltage from the output terminals $V_{OUT1}$ and $V_{OUT2}$ is roughly twice that of the input voltage $V_{IN}$. Hence, voltage doubling is obtained if the output voltage switching unit 340 picks up the one having the highest voltage to be the output voltage at the output terminal $V_0$ among the output terminals $V_{OUT1}$ and $V_{OUT2}$. In FIG. 3, the charge pump circuit 32, like in FIG. 2, includes two capacitors 330 and 332. One end of the capacitor 330 receives the clocking signal CK while the other end of the capacitor 330 couples electrically to the first output terminal 220 of the output voltage generation unit 206. Meanwhile, the first output voltage at the first output terminal 220 is output from the output terminal $V_{OUT1}$. Similarly, one end of the capacitor 332 receives the inverted clocking signal CK' while the other end of the capacitor 332 couples electrically with the second output terminal 322 of the output voltage generation unit 308. The second output voltage at the second output terminal 322 is output from the output terminal $V_{OUT2}$. The control signal generation units 302 and 304 are similar to the control signal generation units 202 and 204 in FIG. 2.

In the following, circuit elements inside a charge pump and an output voltage switching unit are further disclosed. Note that the circuit elements and structure in the subsequent embodiment is just one among many possible arrangements and hence should by no means restrict the scope of this invention.

Figure 4:
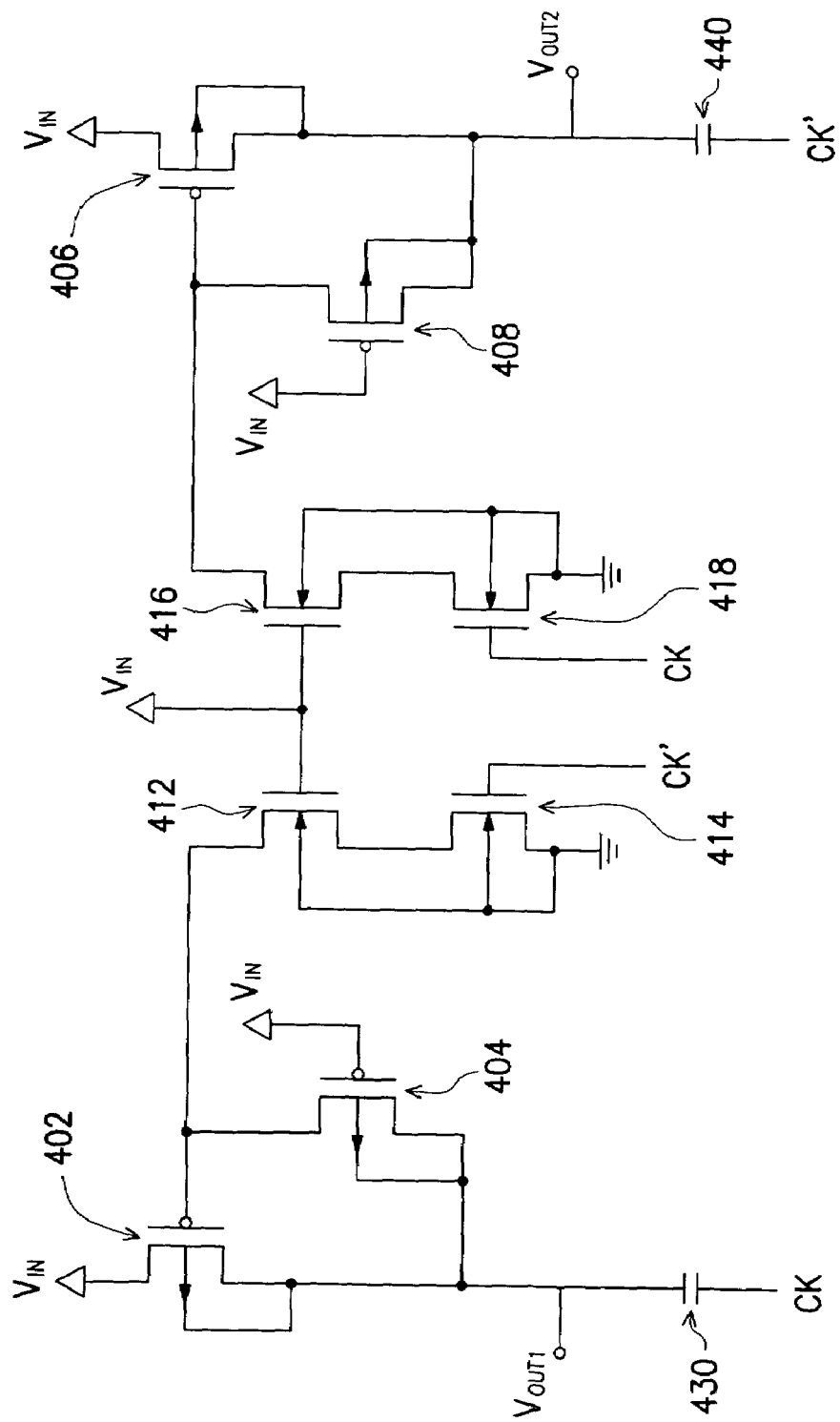
FIG. 4 is an actual circuit diagram of a charge pump according to another preferred embodiment of this invention.

FIG. 4 is an actual circuit diagram of a charge pump according to another preferred embodiment of this invention. As shown in FIG. 4, the charge pump includes P-type metal oxide semiconductor (PMOS) transistors 402, 404, 406 and 408, N-type metal oxide semiconductor (NMOS) transistors 412, 414, 416 and 418 and capacitors 430 and 440. In addition, the charge pump receives an input voltage $V_{IN}$ from a voltage source (not shown) and a clocking signal CK and an inverted signal CK' from a signal source (not shown).

One capacitor terminal (or the first terminal of the first capacitor) of the capacitor 430 (or the first capacitor) receives the clocking signal CK. The other capacitor terminal (or the second terminal of the first capacitor) of the capacitor 430 connects with an output terminal $V_{OUT1}$ for outputting the first output voltage. One capacitor terminal (or the first capacitor terminal of the second capacitor) receives the inverted clocking signal CK'. The other capacitor terminal (or the second capacitor terminal of the second capacitor) of the capacitor 440 (or the second capacitor) connects with another output terminal $V_{OUT2}$ for outputting the second output voltage.

One source/drain terminal (or the first source/drain terminal of the first PMOS transistor) of the PMOS transistor 402 (or the first PMOS transistor) is electrically connected to the capacitor 430 and the substrate (or the substrate of the first PMOS transistor) of the PMOS transistor 402. The other source/drain terminal (or the second source/drain terminal of the first PMOS transistor) of the PMOS transistor 402 is electrically connected to a voltage source for receiving an input voltage $V_{IN}$. Similarly, one source/drain terminal (or the first source/drain terminal of the second PMOS transistor) of the PMOS transistor 404 (or the second PMOS transistor) is electrically connected to the capacitor 430 and the substrate (or the substrate of the second PMOS transistor) of the PMOS transistor 404. The other source/drain terminal (or the second source/drain terminal of the second PMOS transistor) of the PMOS transistor 404 is electrically connected to the gate (or the gate of the first PMOS transistor) or the PMOS transistor 402. Furthermore, the gate (or the gate of the second PMOS transistor) of the PMOS transistor 404 is electrically connected to the voltage source for receiving the input voltage $V_{IN}$.

One source/drain terminal (or the first source/drain terminal of the third PMOS transistor) of the PMOS transistor 406 (or the third PMOS transistor) is electrically connected to the capacitor 440 and the substrate (or the substrate of the third PMOS transistor) of the PMOS transistor 406. The other source/drain terminal (or the second source/drain terminal of the third PMOS transistor) of the PMOS transistor 406 is electrically connected to the voltage source for receiving an input voltage $V_{IN}$. Similarly, one source/drain terminal (or the first source/drain terminal of the fourth PMOS transistor) of the PMOS transistor 408 (or the fourth PMOS transistor) is electrically connected to the capacitor 440 and the substrate (or the substrate of the fourth PMOS transistor) of the PMOS transistor 408. The other source/drain terminal (or the second source/drain terminal of the fourth PMOS transistor) of the PMOS transistor 408 is electrically connected to the gate (or the gate of the third PMOS transistor) of the PMOS transistor 406. Furthermore, the gate (or the gate of the fourth transistor) of the PMOS transistor 408 is electrically connected to the voltage source for receiving the input voltage $V_{IN}$.

The gate (or the gate of the first NMOS transistor) of the NMOS transistor 412 (or the first NMOS transistor) is electrically connected to the voltage source for receiving the input voltage $V_{IN}$. One source/drain terminal (or the second source/drain terminal of the first NMOS transistor) of the NMOS transistor 412 is electrically connected to the gate of the PMOS transistor 402. The substrate (or the substrate of the first NMOS transistor) is connected to a ground. One source/drain terminal (or the first source/drain terminal of the second NMOS transistor) of the NMOS transistor 414 (or the second NMOS transistor) and the substrate (or the substrate of the second NMOS transistor) of the NMOS transistor 414 are connected to a ground. The other source/drain terminal (or the second source/drain terminal of the second NMOS transistor) of the NMOS transistor 414 is electrically connected to a source/drain terminal (or the first source/drain terminal of the first NMOS transistor) of the NMOS transistor 412. The gate (or the gate of the second NMOS transistor) of the NMOS transistor 414 receives the inverted clocking signal CK'. The gate (or the gate of the third NMOS transistor) of the NMOS transistor 416 (or the third NMOS transistor) is electrically connected to the voltage source for receiving the input voltage $V_{IN}$. A source/drain terminal (or the second source/drain terminal of the third NMOS transistor) of the NMOS transistor 416 is electrically connected to the gate of the PMOS transistor 406. The substrate (or the substrate of the third NMOS transistor) of the NMOS transistor 416 is electrically connected to a ground. A source/drain terminal (or the first source/drain terminal of the fourth NMOS transistor) of the NMOS transistor 418 (or the fourth NMOS transistor) and the substrate (the substrate of the fourth NMOS transistor) of the NMOS transistor 418 are electrically connected to a ground. The other source/drain terminal (or the second source/drain terminal of the fourth NMOS transistor) of the NMOS transistor 418 is electrically connected to the source/drain terminal (or the first source/drain terminal of the third NMOS transistor) of the NMOS transistor 416. Furthermore, the gate (or the gate of the fourth NMOS transistor) of the NMOS transistor 418 receives the clocking signal CK.

To explain the operation of the charge pump according to this invention, assume the first and the second output voltage is at 0V initially. In addition, assume the fluctuation range of the clocking signal CK and the inverted clocking signal CK' is between 0 to $V_{IN}$ volts and that the initial voltage value of the clocking signal CK is 0 and the initial voltage value of the inverted clocking signal CK' is at $V_{IN}$.

At the very beginning, because the voltage value of the inverted clocking signal CK' is at $V_{IN}$, the NMOS transistor 414 conducts and hence the source/drain terminal of the NMOS transistor 414 and the source/drain terminal of the NMOS transistor 412 are at 0V. Since the gate terminal of the NMOS transistor 412 receives the input voltage $V_{IN}$, the NMOS transistor 412 conducts and hence the source/drain terminal of the NMOS transistor 412, the source/drain terminal of the PMOS transistor 404 and the gate terminal of the PMOS transistor 402 are at 0V. Because the gate terminal of the PMOS transistor 404 is at $V_{IN}$ while the source/drain is at 0V, the PMOS transistor 404 is non-conductive. On the contrary, because the source/drain terminal of the PMOS transistor 402 receives the input voltage $V_{IN}$ while the gate is at 0V, the PMOS transistor 402 conducts and hence the input voltage starts to charge up the capacitor 430. Since the clocking signal CK is at a 0V, voltage difference between the terminals of the capacitor 430 approaches $V_{IN}$ if sufficient time is given. In other words, the first output voltage from the output terminal $V_{OUT1}$ approaches the input voltage $V_{IN}$.

Conversely, because the clocking signal CK is at 0V, the NMOS transistor 418 is non-conductive. Since the gate terminal of the NMOS transistor 416 receives the input voltage $V_{IN}$, the NMOS transistor 416 conducts and hence the voltage value at the source/drain terminal of the PMOS transistor 416, the source/drain terminal of the PMOS transistor 406 and the gate of the PMOS transistor 406 approach $V_{IN}$. Since the voltage value at the gate terminal of the PMOS transistor 408 is $V_{IN}$, which is at a high level causing the PMOS transistor 408 to be non-conductive. Similarly, because the input voltage $V_{IN}$ received by the source/drain terminal of the PMOS transistor 406 is close to the voltage received by the gate terminal, the PMOS transistor 406 is non-conductive. Therefore, the second output voltage from the output terminal $V_{OUT2}$ is roughly identical to the inverted clocking signal CK'. In other words, the second output voltage from the output terminal $V_{OUT2}$ approaches $V_{IN}$.

When the clocking signal CK reverses, that is, the voltage value of the clocking signal CK becomes $V_{IN}$ while the voltage value of the inverted clocking signal CK' becomes 0, both the PMOS transistor 402 and the PMOS transistor 404 are non-conductive according to the aforementioned derivation at the output terminal $V_{OUT2}$. Hence, due to the transient maintenance of existing voltage differential between the terminals of the capacitor 430, the first output voltage at the output terminal $V_{OUT1}$ is pushed up to $V_{IN}+V_{IN}$, that is, $2*V_{IN}$, transiently. Furthermore, because both the PMOS transistors 402 and 404 are non-conductive, the $2*V_{IN}$ voltage at the output terminal $V_{OUT1}$ can be maintained. On the other hand, when the voltage value of the inverted clocking signal CK' is 0, voltage differential between the two terminals of the capacitor 440 is maintained transiently. Hence, voltage at the capacitor terminal will drop to 0V simultaneously. However, because the PMOS transistors 406 and 408 will conduct, the input voltage $V_{IN}$ will continue to charge up the output terminal $V_{OUT2}$ until the voltage at the output terminal $V_{OUT2}$ almost reaches $V_{IN}$ if sufficient time is allowed.

Thereafter, as the clocking signal CK reverses, the PMOS transistor 402 and 404 will be conductive. Thus, voltage at the output terminal $V_{OUT1}$ is maintained at $V_{IN}$. On the other hand, because the PMOS transistors 406 and 408 are non-conductive, voltage at the output terminal $V_{OUT2}$ is maintained at $V_{IN}$. Under the condition that the capacitor 440 receives a voltage $V_{IN}$ from the inverted clocking signal CK', the second output voltage from the output terminal $V_{OUT2}$ is $2*V_{IN}$.

Henceforth, the first output voltage and the second output voltage from the output terminals $V_{OUT1}$ and $V_{OUT2}$ will fluctuate cyclically between $V_{IN}$ and $2*V_{IN}$. Yet, the gate-substrate interface inside the PMOS transistors 402, 404, 406 and 408 only has to withstand a voltage differential of $V_{IN}$ instead of a voltage differential of $2*V_{IN}$ in a conventional circuit.

Figure 5:
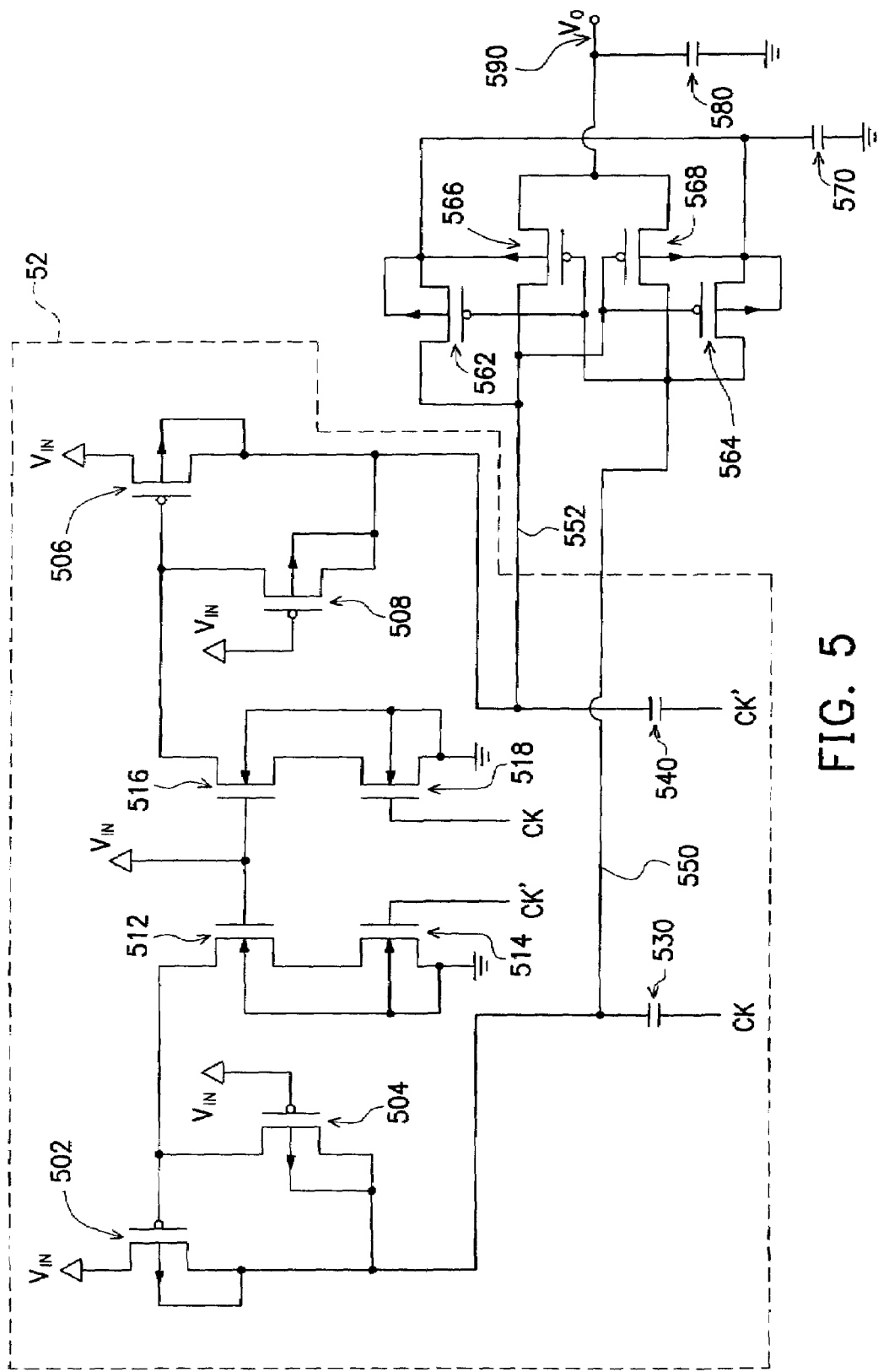
FIG. 5 is an actual circuit diagram of a voltage doubler according to another preferred embodiment of this invention.

FIG. 5 is an actual circuit diagram of a voltage doubler according to another preferred embodiment of this invention. As shown in FIG. 5, the charge pump 52 is structurally similar to the one in FIG. 4 and hence detailed description of its operation is not repeated here. The elements of 502–508, 512–518, 530 and 540 are similar to the elements 402–408, 412–418, 430, and 440 in FIG 4. The charge pump 52 with an application as an example has output terminals similar to the first output terminal $V_{OUT1}$ and the second output terminal $V_{OUT2}$ as shown in FIG. 4, and numbered in FIG. 5 as 550 and 552, respectively. In the same way, when the voltage of the clocking signal and the inverted clocking signal oscillates between 0 and $V_{IN}$, voltage at the first output terminal $V_{OUT1}$ and the second output terminal $V_{OUT2}$ oscillates at a voltage between $V_{IN}$ and $2*V_{IN}$. In the following, operation of the circuit outside the charge pump 52 is explained in detail.

Aside from the charge pump 52, the circuit in FIG. 5 further includes four PMOS transistors 562, 564, 566 and 568, a substrate capacitor 570 and an output capacitor 580. One source/drain terminal (or the first source/drain terminal of the fifth PMOS transistor) of the PMOS transistor 562 (or the fifth PMOS transistor) is electrically connected to the aforementioned second output terminal $V_{OUT2}$ of the charge pump 52. The other source/drain terminal (or the second source/drain terminal of the fifth PMOS transistor) of the PMOS transistor 562 is electrically connected to the substrate (or the substrate of the fifth PMOS transistor) of the PMOS transistor 562. The gate (or the gate of the fifth PMOS transistor) of the PMOS transistor 562 is electrically connected to the aforementioned first output voltage terminal $V_{OUT1}$ of the charge pump 52. One source/drain terminal (or the first source/drain terminal of the sixth PMOS transistor) of the PMOS transistor 564 (or the sixth PMOS transistor) is electrically connected to the first output terminal $V_{OUT1}$. The other source/drain terminal (or the second source/drain terminal of the sixth PMOS transistor) of the PMOS transistor 564 is electrically connected to the substrate (or the substrate of the sixth PMOS transistor) of the PMOS transistor 564. The gate (or the gate of the sixth PMOS transistor) of the PMOS transistor 564 is electrically connected to the second output terminal $V_{OUT2}$.

In addition, one source/drain terminal (or the first source/drain terminal of the seventh PMOS transistor) of the PMOS transistor 566 (or the seventh PMOS transistor) is electrically connected to the second output terminal $V_{OUT2}$. The other source/drain terminal (or the second source/drain terminal of the seventh PMOS transistor) of the PMOS transistor 566 is electrically connected to a final output terminal 590 for outputting a final output voltage $V_O$. The substrate (or the substrate of the seventh PMOS transistor) of the PMOS transistor 566 is electrically connected to the substrate and source/drain terminal of the PMOS transistor 562. The gate (or the gate of the seventh PMOS transistor) of the PMOS transistor 566 is electrically connected to the first output voltage terminal $V_{OUT}$. One source/drain terminal (or the first source/drain terminal (or the eighth PMOS transistor) of the PMOS transistor 568 (or the eighth PMOS transistor) is electrically connected to the first output voltage terminal $V_{OUT1}$. The other source/drain terminal (or the second source/drain terminal of the eighth PMOS transistor) of the PMOS transistor 568 is electrically connected to the final output terminal 590. The substrate (or the substrate of the eighth PMOS transistor) of the PMOS transistor 568 is electrically connected to the substrate of the PMOS transistor 564. The gate (or the gate of the eighth PMOS transistor) of the PMOS transistor 568 is electrically connected to the second output voltage terminal $V_{OUT2}$.

Finally, one end of the substrate capacitor 570 is electrically connected to a ground while the other end of the substrate capacitor 570 is electrically connected to the substrates of the PMOS transistors 562, 564, 566 and 568. One end of the output capacitor 580 is electrically connected to a ground while the other end is electrically connected to the output terminal 590.

Assume the first output voltage $V_{OUT1}$ is at $V_{IN}$ and the second output voltage $V_{OUT2}$ is at $2*V_{IN}$ after oscillation in the first output voltage $V_{OUT1}$, and the second output voltage $V_{OUT2}$ is stabilized. Under these conditions, the PMOS transistors 562 and 566 are conductive while the PMOS transistors 564 and 568 are non-conductive so that the second output voltage $V_{OUT2}$ (at a voltage $2*V_{IN}$) charges up the output capacitor 580. When the second output voltage $V_{OUT2}$ becomes $V_{IN}$, the PMOS transistors 562 and 566 are non-conductive while the PMOS transistor 564 and 568 are conductive so that the first output voltage $V_{OUT1}$ (at a voltage $2*V_{IN}$) charges up the output capacitor 580. Accordingly, if sufficient waiting time is allowed, the final output voltage $V_O$ at the output terminal 590 will stabilize at a value double that of the input voltage, that is, $2*V_{IN}$.

Although MOS transistors are used in the circuit of this invention, similar devices such as metal-oxide-semiconductor field effect transistor (MOSFET), enhanced metal-oxide-semiconductor field effect transistor (enhanced MOSFET) or complementary metal-oxide-semiconductor (CMOS) are also applicable.

In summary, the voltage difference at the gate-substrate, gate-drain and gate-source interface inside the charge pump of this invention is smaller than the conventional circuit. In particular, peak voltage difference between the gate-substrate is only half the value in the conventional circuit. Consequently, a low pressure CMOS fabrication process can be used to fabricate MOS devices having a voltage push-up capacity identical to the conventional technique but with a longer working life.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A charge pump, comprising:
a voltage source for providing an input voltage;
a signal source for providing a clocking signal and a phase inverted signal of the clocking signal needed to operate the charge pump;
a first control signal generation unit, wherein the first control signal generation unit receives the input voltage, the phase inverted clocking signal and a ground voltage and outputs a first control signal, and the voltage level of the first control signal is determined by the phase inverted clocking signal;
a first output voltage generation unit, wherein the first output voltage generation unit receives the input voltage and the first control signal and outputs via a first output terminal, and where a connection of the input voltage with the first output terminal is determined by a circuit inside the first output voltage generation unit that depends on the first control signal;
a second control signal generation unit, wherein the second control signal generation unit receives the input voltage, the clocking signal and the ground voltage and outputs a second control signal, and the voltage level of the second control signal is determined by the clocking signal;
a second output voltage generation unit, wherein the second output voltage generation unit receives the input voltage and the second control signal and outputs via a second output terminal, and where a connection of the input voltage with the second output terminal is determined by a circuit inside the second output voltage generation unit that depends on the second control signal;
a first capacitor having a first terminal receiving the clocking signal and a second terminal to output a first output voltage, and the second terminal of the first capacitor is connected to the first output terminal; and
a second capacitor having a first terminal receiving the phase inverted clocking signal and a second terminal to output a second output voltage, and the second terminal of the second capacitor is connected to the second output terminal.

2. The charge pump in claim 1, wherein the first output voltage generation unit comprises:
a first P-type metal oxide semiconductor (PMOS) transistor having a substrate, a gate, a drain terminal and a source terminal, wherein the drain terminal of the first PMOS transistor is connected to the second terminal of the first capacitor and the substrate of the first PMOS transistor, and the source terminal of the first PMOS transistor is connected to the input voltage; and
a second P-type metal oxide semiconductor (PMOS) transistor having a substrate, a gate, a drain terminal and a source terminal, wherein the drain terminal of the second PMOS transistor is connected to the second terminal of the first capacitor and the substrate of the second PMOS transistor, the source terminal is connected to the gate of the first PMOS transistor, and the gate of the second PMOS transistor is connected to the input voltage, wherein the first and second PMOS's form a part of the circuit inside the first output voltage generation unit.

3. The charge pump in claim 2, wherein the first control signal generation unit comprises:
a first N-type metal oxide semiconductor (NMOS) transistor having a substrate, a gate, a drain terminal and a source terminal, wherein the gate of the first NMOS transistor is connected to the input voltage, the source terminal of the first NMOS transistor is connected to the gate of the first PMOS transistor, and the substrate of the first NMOS transistor is connected to the ground; and a second N-type metal oxide semiconductor (NMOS) transistor having a substrate, a gate, a drain terminal and a source terminal, wherein the drain terminal of the second NMOS transistor and the substrate of the second NMOS transistor are connected to the ground, the source terminal of the second NMOS transistor is connected to the drain terminal of the first NMOS transistor and the gate of the second NMOS transistor receives the phase inverted clocking signal.

4. The charge pump in claim 1, wherein the second output voltage generation unit comprises:

a first P-type metal oxide semiconductor (PMOS) transistor having a substrate, a gate, a drain terminal and a source terminal, wherein the drain terminal of the first PMOS transistor is connected to the second terminal of the second capacitor and the substrate of the first PMOS transistor, and the source terminal of the first PMOS transistor is connected to the input voltage; and a second P-type metal oxide semiconductor (PMOS) transistor having a substrate, a gate, a drain terminal and a source terminal, wherein the drain terminal of the second PMOS transistor is connected to the second terminal of the second capacitor and the substrate of the second PMOS transistor, the source terminal of the second PMOS transistor is connected to the gate of the first PMOS transistor, and the gate of the second PMOS transistor is connected to the input voltage, wherein the first and second PMOS's form a part of the circuit inside the second output voltage generation unit.

5. The charge pump in claim 4, wherein the second control signal generation unit comprises:

a first N-type metal oxide semiconductor (NMOS) transistor having a substrate, a gate, a drain terminal and a source terminal, wherein the gate of the first NMOS transistor is connected to the input voltage, the source terminal of the first NMOS transistor is connected to the gate of the first PMOS transistor, and the substrate of the first NMOS transistor is connected to the ground; and a second N-type metal oxide semiconductor (NMOS) transistor having a substrate, a gate, a drain terminal and a source terminal, wherein the drain terminal of the second NMOS transistor and the substrate of the second NMOS transistor are connected to the ground, the source terminal of the second NMOS transistor is connected to the drain terminal of the first NMOS transistor and the gate of the second NMOS transistor receives the clocking signal.

6. A voltage doubler with a charge pump as in claim 1 therein, comprising an output voltage switching unit receiving the first and second output voltages, and delivering a final output voltage.

7. The voltage doubler of claim 6, wherein the output voltage switching unit comprises:

a first P-type metal oxide semiconductor (PMOS) transistor having a substrate, a gate, a drain terminal, and a source terminal, wherein the source terminal of the first PMOS transistor receives the second output voltage, the drain terminal of the first PMOS transistor is connected to the substrate of the first PMOS transistor, and the gate of the first PMOS transistor receives the first output voltage;

a second P-type metal oxide semiconductor (PMOS) transistor having a substrate, a gate, a drain terminal and a source terminal, wherein the source terminal of the second PMOS transistor receives the first output voltage, the drain terminal of the second PMOS transistor is connected to the substrate of the second PMOS transistor, and the gate of the second PMOS transistor receives the second output voltage;

a third P-type metal oxide semiconductor (PMOS) transistor having a substrate, a gate, a drain terminal and a source terminal, wherein the source terminal of the third PMOS transistor is receiving the second output voltage, the drain terminal of the third PMOS transistor connects to a final output voltage terminal, the substrate of the third PMOS transistor is connected to the substrate of the first PMOS transistor, and the gate of the third PMOS transistor receives the first output voltage;

a fourth P-type metal oxide semiconductor (PMOS) transistor having a substrate, a gate, a drain terminal and a source terminal, wherein the source terminal of the fourth PMOS transistor is receiving the first output voltage, the drain terminal of the fourth PMOS transistor is connected to the final output voltage terminal, the substrate of the fourth PMOS transistor is connected to the substrate of the second PMOS transistor, and the gate of the fourth PMOS transistor is receiving the second output voltage;

an output capacitor having two terminals, wherein one terminal is connected to the ground and the other terminal is connected to the final output voltage terminal; and a substrate capacitor having two terminals, wherein one terminal is connected to the ground and the other terminal is connected to the substrate of the first PMOS transistor.

* * * * *